(12) United States Patent
Nguyen et al.

(10) Patent No.: US 6,377,354 B1
(45) Date of Patent: Apr. 23, 2002

(54) SYSTEM AND METHOD FOR PRINTING A DOCUMENT HAVING MERGED TEXT AND GRAPHICS CONTAINED THEREIN

(75) Inventors: Amanda Nguyen, Bothell; Ganesh Pandey, Kirkland; Alvin Scholten, Redmond; Zhanbing Wu, Bellevue; Eigo Shimizu, Seattle; Peter Wong, Woodinville, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/157,604

(22) Filed: Sep. 21, 1998

(51) Int. Cl.[7] .................................................. B41B 1/00
(52) U.S. Cl. ..................................... 358/1.11; 358/1.15
(58) Field of Search ................................. 358/1.1, 1.13, 358/1.14, 1.15, 1.11; 710/8, 10, 14; 400/62, 61, 70, 76

(56) References Cited

U.S. PATENT DOCUMENTS 5,604,843 A   2/1997  Shaw et al.
5,913,016 A * 6/1999  Matsayama ................. 358/1.13
6,210,051 B1 * 4/2001  Sakurai ........................ 408/62

OTHER PUBLICATIONS

*The Unicode Standard Version 2.0*, The Unicode Consortium, Addison–Wesley Press, 1997.

* cited by examiner

Primary Examiner—Arthur G. Evans
(74) Attorney, Agent, or Firm—Leydig, Voit & Mayer, Ltd.

(57) ABSTRACT

A system and method of printing documents having merged text and graphics is presented which overcomes the Z-order problem of merging text and graphics on a raster printer and which enhances printing performance. The system and method analyze a location of the text and graphics elements to be printed to determine if and where any potential merging problems exist. In these regions, the system and method selectively redraws the text as part of the merged bitmap graphic. The remainder of the text on the document is printed with device resident fonts, either directly or through downloading the device font, if possible. This greatly enhances printing performance. If the text information is not supported or supportable by a device font, the text elements are drawn as bitmaps to be printed by the printer.

9 Claims, 6 Drawing Sheets

SYSTEM AND METHOD FOR PRINTING A DOCUMENT HAVING MERGED TEXT AND GRAPHICS CONTAINED THEREIN

FIELD OF THE INVENTION

The instant invention relates to the electronic printing of documents from a computer, and more particularly to a system and method for correctly ordering and printing graphics within a merged text and graphics document for printing from a computer by a raster printer.

BACKGROUND OF THE INVENTION

Continued advances in computer technology have lead to not only increased performance, but also increased performance expectations by the users of such equipment. These increased user expectations extend not only to processing speed capability, but also to all aspects and peripheral equipment associated with a home or business computing environment. The industry has responded with increased speed for CD ROM drives, communication modems, and even faster printers having advanced document handling features. However, it is not simply enough to utilize a faster processor in conjunction with peripheral equipment having performance enhancing features without also including software drivers and an operating system which allows the full advantage of the increased hardware capabilities to be taken advantage of.

This is particularly true in the area of document printing. Initially, the vast majority of all documents sent to a computer printer were text only documents with very little, if any, formatting. The printers on which these documents were printed included daisy wheel or ball type printers which required only that the computer send down the proper character commands to allow printing of the proper text character. As the computing equipment advanced, so did the sophistication of the computer user. Strict text only unformatted documents utilizing only a single font were no longer acceptable. The computer industry responded by allowing the computer to command a printer to draw various True Type fonts which greatly enhanced the appearance of the computer printed document. However, it was a concern that the performance of the printers would be affected by having to draw all of the characters on a printed document. In response, printer manufacturers began installing device resident fonts within the memory of the printers to allow a very rapid data transfer to occur from the computer to the printer. With installed device fonts the computer is required only to send a character address code to the printer to allow the printer to select and print the correct character. This greatly reduced the amount of data transferred between computer and printer, and greatly enhanced the printing performance.

During this development of better ways to format and print text documents, the use and integration of graphics within a computer generated text document was also introduced. School and company newsletters, technical reports, financial presentations, etc. all were utilizing text and graphics in an integrated computer printed document. Initially, the inserted graphics occupied a given space on a page, but continuing advances soon allowed the text of the document to be wrapped around the graphics, or layered over the graphics in the case of a computer generated watermark. Because the inclusion of graphics greatly enhanced the appearance of what would otherwise be considered a dull page of only text, the use of graphics greatly increased. However, it was soon realized that the use of both graphics and text in the same document presented significant problems for the computer hardware, software, and operating systems of the day.

Figure 5:
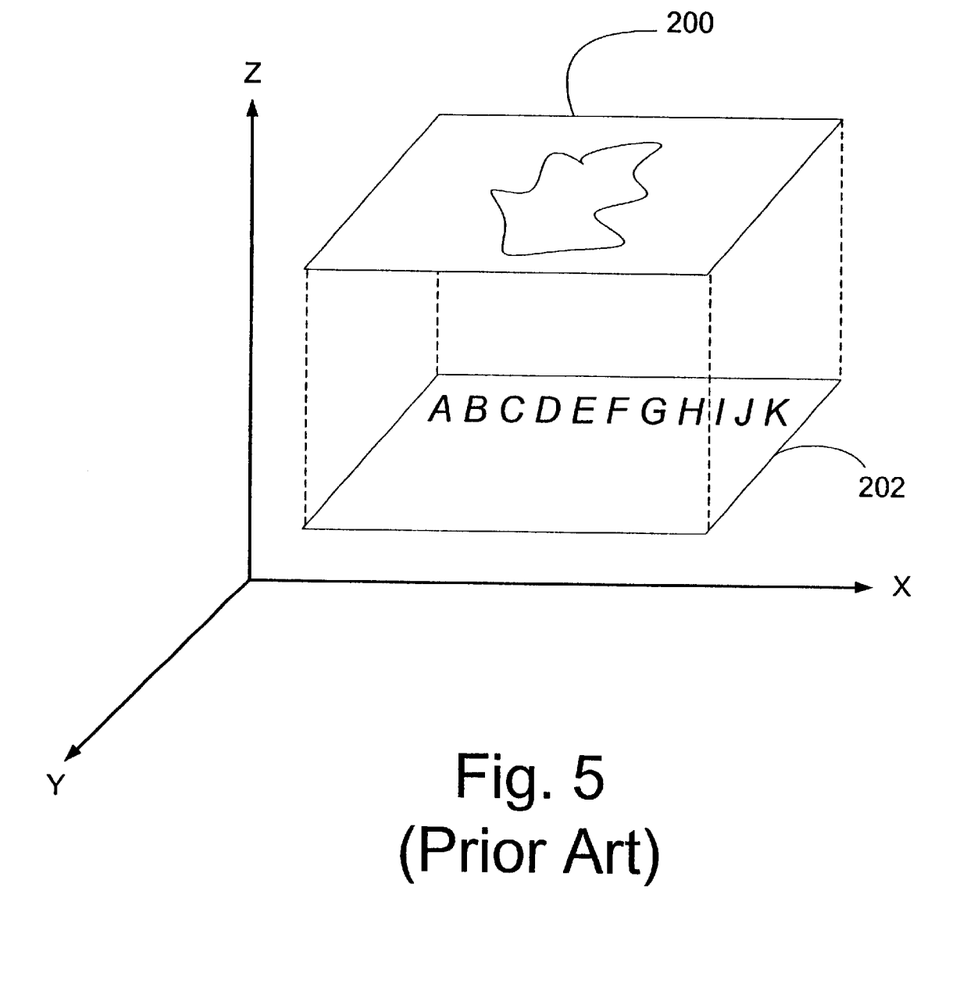
FIG. 5 is a graphical visualization of a prior frame buffer based driver with text support exhibiting a Z-order problem.

To allow a computer generated document to be printed by a computer printer requires the use of a printer driver. Such a printer driver interfaces the output from the application program which generated the document to the physical printer device which will actually put ink on paper. The more recent printer drivers were frame buffer based with text support. As such, a page of a document to be printed was essentially split into a bitmap graphics frame 200 and a text frame 202 as illustrated in FIG. 5. The bitmap graphics frame 200 contained all of the bitmap graphical images which were to be printed on the document, while the text frame contained all of the textual information for that same document. Within this prior printer driver, both the graphics frame 200 and the text frame 202 existed at different levels within the driver as illustrated graphically in FIG. 5. Because all of the graphics in a document existed in the bitmap frame 200, the specific order and layering of these drawing objects were not always maintained when combined with the separate text frame 202 and printed at the printer device. This could result in the graphic color highlighting of the text actually covering, and therefore obscuring, the text to be highlighted. Because of the visualization of the separate frames for both text and bitmap graphics, this problem became known as the Z-order problem. This nomenclature was chosen to convey the lack of proper layering of the different frames 200, 202 as the document was printed. This Z-order problem resulted in not only a poor quality printed document which did not appear on the printed page as it did on the computer monitor.

One prior solution which overcomes the Z-ordering problem of the text and graphics draws the entire page as a single bitmap graphic. The document to be printed is essentially transformed into a picture of the document to be printed by the computer printer. However, while this alleviates the problem of properly combining and layering the separate text and bitmap graphics frames of the prior printer driver, the resulting degradation in printer performance due to the extreme amount of data to be transferred to the printer is unacceptable. Printer speed and performance is greatly affected, and the included device fonts resident within the printer are not be utilized, therefore wasting the advanced features of modem computer printers. Such a solution, therefore, is not acceptable.

Another solution to the Z-order problem which some drivers utilize is to send objects to the printer as they are encountered from the GDI (although, this capability is not available on all printer devices). This method takes advantage of the raster operations (ROPs) which are available in the windows environment. These ROPs allow print elements to be combined in logical ways (e.g., XOR) to ensure that they are printed in the correct order. For a highlighted block of text, the GDI may send the text elements first, and then the colored box. ROP allows these elements to be combined so that the text is not printed first, and then covered (obscured) by the colored box. Unfortunately, many of the printers on the market do not support the downloading of all graphics objects or all of the ROPs available within the Windows environment. As a result, a document with merged text and graphics may still not print correctly due to the lack of support for at least some of the ROP functions needed by these drivers.

There therefore exists a need in the art for a system and method which allows the correct printing of documents having merged text and graphics, i.e., incorporating a solution for the Z-order problem. However, there also exists a need for documents to be printed with enhanced performance and greater speed allowing advanced printer functions to be taken advantage of to the greatest extent possible.

SUMMARY OF THE INVENTION

In view of the above identified and other problems existing in the art, a preferred embodiment of the instant invention provides a printer driver which overcomes the Z-order problem of correctly printing merged text and graphics documents. A preferred embodiment further enhances the printing performance by utilizing, to the maximum extent possible, the device fonts resident within the physical printer device. Preferably, an embodiment of the printer driver of the instant invention analyzes the document which it is printing to determine the overlap of any text and graphics contained therein. If an overlap of text and graphics is detected, a preferred embodiment of the printer driver of the instant invention selectively draws only the overlapping text as graphics on a frame buffer. If there is no merging or overlapping of text and graphics on the document which is being printed, the text is simply downloaded or sent as a device font directly to the printer device. Preferably, the printer driver of the instant invention utilizes font substitution and selective drawing of text as graphics to ensure proper printing of either text only, or text and graphics merged documents without loss or degradation of printer performance.

In a preferred embodiment of the printer driver of the instant invention, the driver determines for each text object whether there is any previously drawn graphics in the bitmap where the text is to be drawn. If such a bitmap is found, the text is also drawn in the bitmap so that it can properly interact with the graphics on the printed page. If no such overlapping graphics and text is detected, the text is downloaded or sent as a device font directly to the printer to allow for better printing performance. Preferably, the printer driver of the instant invention also maintains text location information concerning the location of where text has been downloaded directly to the printer. This textual location information is utilized in the event that a graphics image is to be drawn over text which has already been downloaded to the printer. If this situation is detected, a preferred embodiment of the driver of the instant invention sends a blank bitmap image, preferably a white rectangle, directly to the printer to erase or overwrite the appropriate region in the printer to ensure correct output when the text and bitmaps are combined during the print process. Preferably, an embodiment of the printer driver of the instant invention accomplishes the above in a single pass fashion as the print commands are received from the graphics device interface (GDI). The elimination of any subsequent passes through the print command or data information, also greatly enhances the overall performance of the printing function.

These and other features of the invention will become more apparent from the following detailed description when taken in conjunction with the accompanying drawings.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Figure 1:
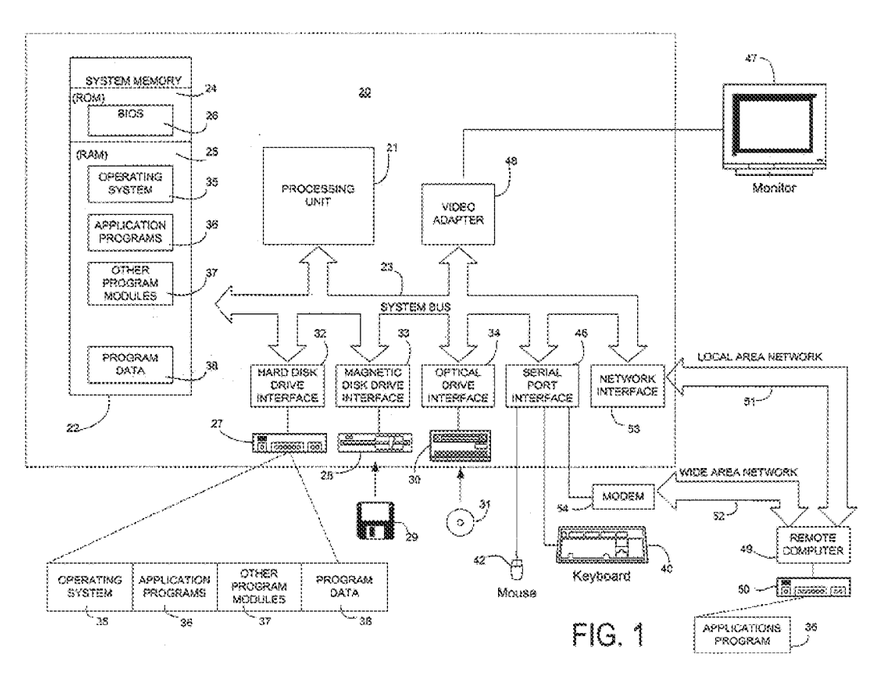
FIG. 1 is a simplified block diagram illustrating an exemplary operating environment suitable for application of the instant invention.

FIG. 1 in the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, microprocessor systems, microprocessor-based or programmable computer electronics, network PCs, minicomputers, mainframe computers, and the like. The invention may also be practiced and distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purposed computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during startup, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other date for the personal computer 20. Although the exemplary environment described herein employs a hard disk, a removable magnetic disk 29 and a removable optical disk 31, it should be appreciated by those skilled in the art that other types of computer readable media which can store data that is accessible by the computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system busy 23 via an interface, such as a video adapter 48. In addition to the monitor, personal computers typical include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device, or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN working environment, the personal computer 20 is connected to the local network 51 through a network interface or adapter 53. When used in a WAN networking environment, the personal computer 20 typically includes a modem 54 or other means for establishing communications over the y-area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing the communications link between the computers may be used.

Having now described both the problem existing in the art and a suitable environment into which the solution provided by the printer driver of the instant invention is suitably applied, the focus is now turned to a description of an embodiment of the printer driver of the instant invention. As will become apparent, the method implemented in an embodiment of the instant invention overcomes the Z-order problem described above in relation to the printing of documents having merged text and graphics. Preferably, the system and method of the instant invention is implemented in a universal printer driver which may be included as part of an operating system, such as Windows NT 5.0. Such a universal printer driver is described in co-pending application Ser. No. 09/157,895, filed on even date herewith, for a MODULAR AND EXTENSIBLE PRINTER DEVICE DRIVER AND TEXT BASED METHOD FOR CHARACTERIZING PRINTER DEVICES FOR USE THEREWITH, assigned to the assignee of the instant application, the disclosure and teachings of which are hereby incorporated by reference. However, as will be recognized by one skilled in the art, the system and method of the instant invention may be implemented in other architectures other than that listed above, the inclusion of which is hereby reserved.

Figure 2:
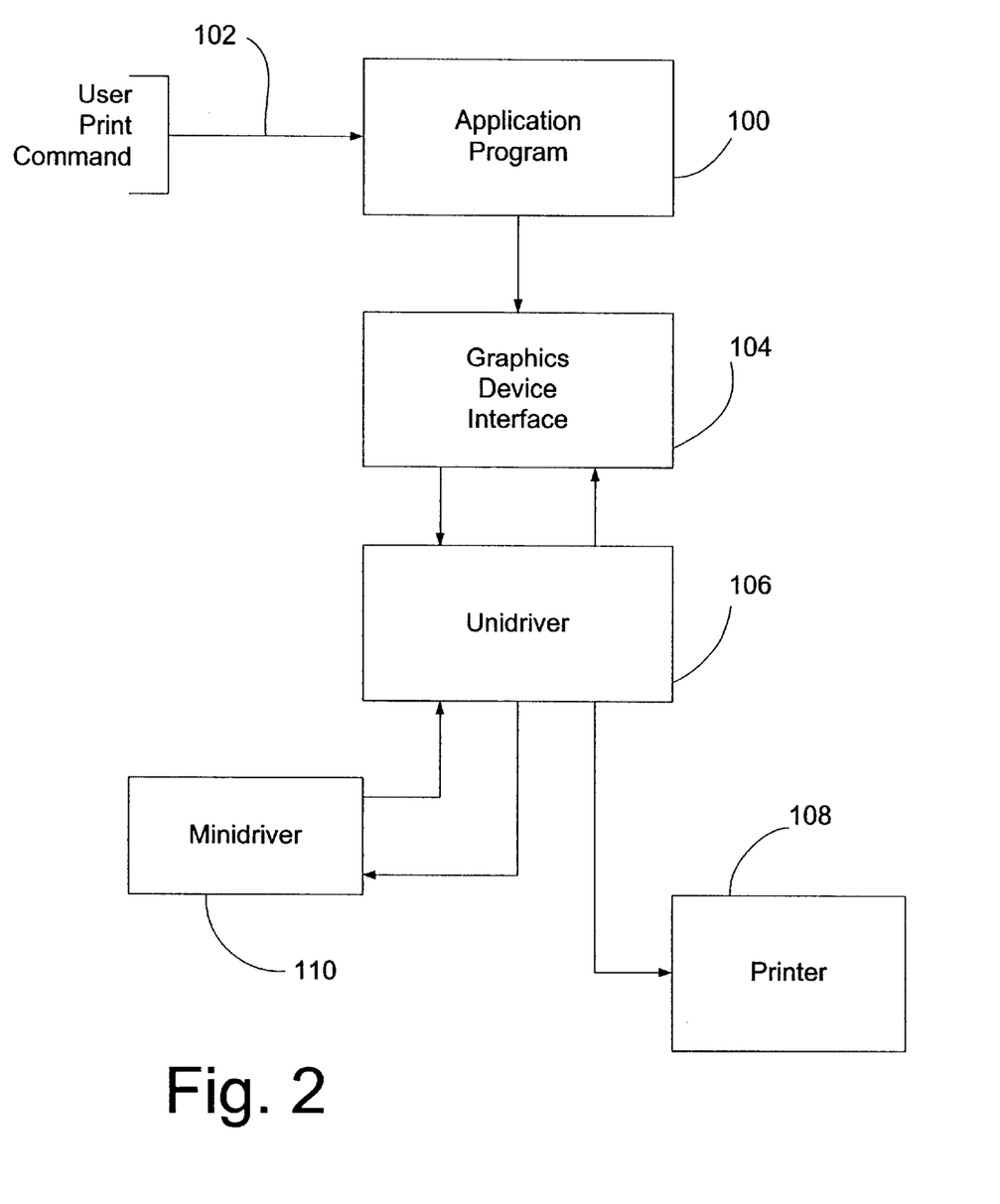
FIG. 2 is a simplified block diagram illustrating a functional flow from an operator initiated print command to document printing by a printer in accordance with an embodiment of the instant invention.

The system and method of the instant invention will now be described in a preferred implementation with reference initially to FIG. 2. As illustrated in this figure, a document creating application program 100, upon receiving a user print command 102, transfers the document data to the graphics device interface (GDI) 104. The graphics device interface 104 serves as an interface between the application program 100 and the universal printer driver 106. This universal printer driver 106 outputs data to the printer 108 in proper form for that printer, and initiates various printer command functions in accordance with the printer characterization data supplied to it from the generic description data file (GPD). The Minidriver is optional for customization and is described in greater detail in the above referenced co-pending application which is incorporated herein by reference. The minidriver 110 is preferably supplied by the printer manufacturer to allow proper interfacing of the universal printer driver 106 with the particular control functions and supported data types implemented by this particular printer manufacturer.

Figure 3A:
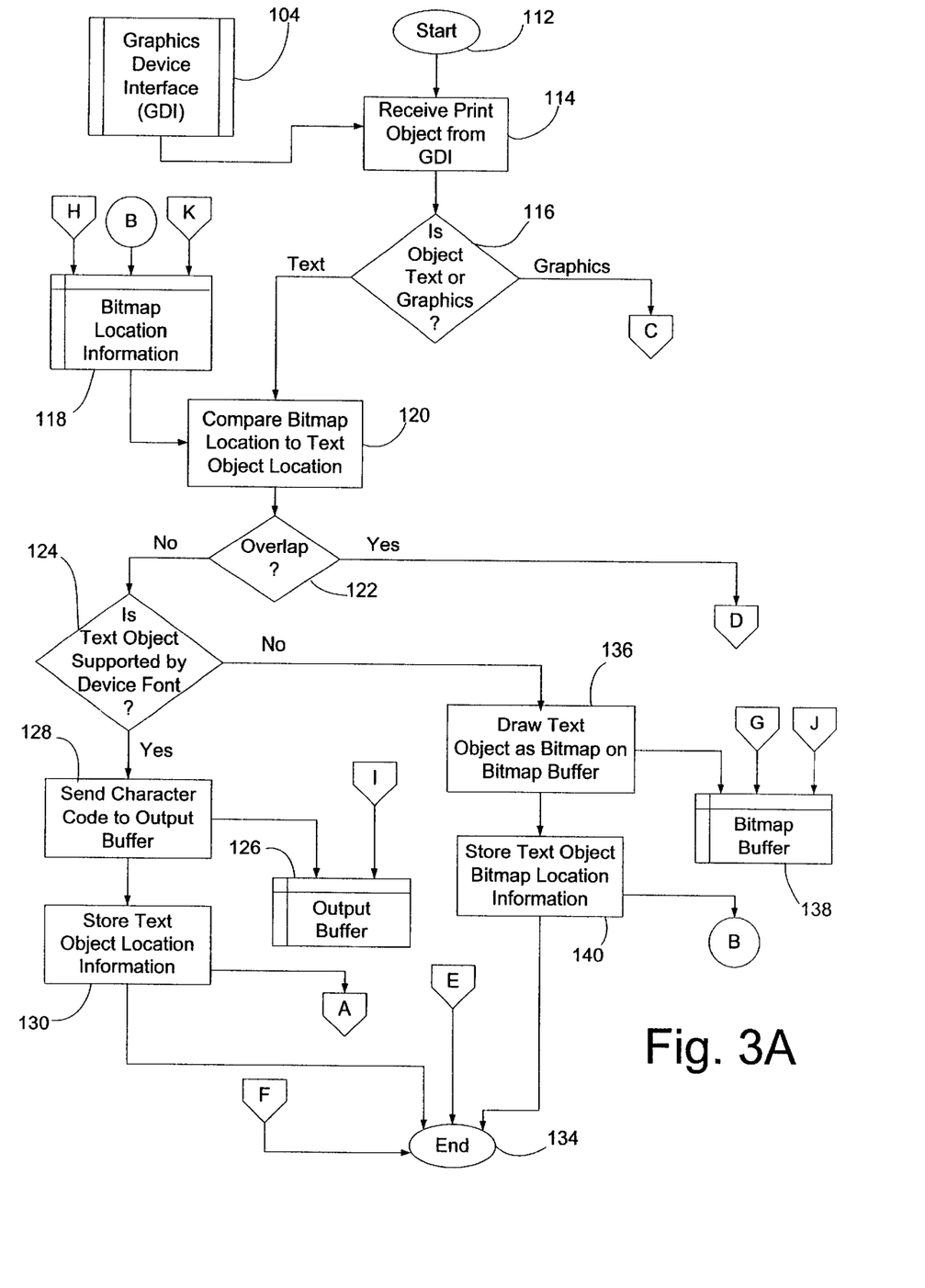
FIGS. 3A and 3B illustrate a process flow diagram in accordance with the teachings of an embodiment of the instant invention.
Figure 3B:
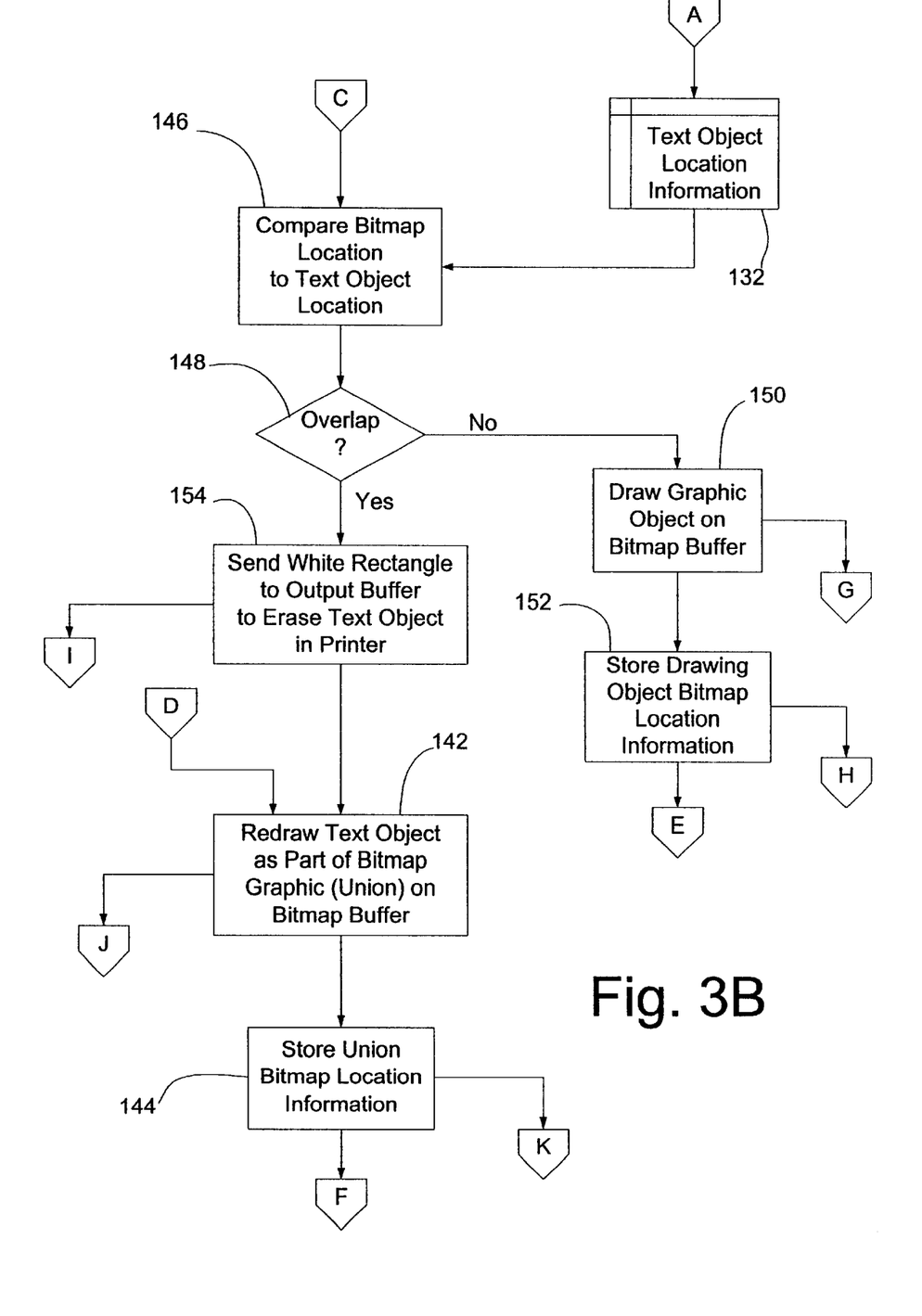

As implemented in this exemplary embodiment, the system and method of the instant invention eliminates the Z-order problem existing with prior drivers when printing documents having merged text and graphics. As illustrated in FIGS. 3A and 3B, upon once called 112 the printer driver initially receives from the graphics device interface 104, among other commands, a print object 114. Upon receipt of the print object from the GDI 104, the driver then determines whether the object is a text or graphics object 116. If the print object is text, the driver compares bitmap location information stored in a memory element 118 to the location at which the text object is to be printed 120.

If this comparison reveals that there is no overlap 122 between the location at which the text object is to be printed and the location at which any bitmaps are to be printed, the driver next analyzes the text object to determine if the utilized font may be supported by a printer resident device font 124. If this text object is supported by a device resident font, the driver then sends 128 the 1, 2, or multi-byte character code to the output buffer 126 for retrieval and printing by the printer. This generation of 1, 2, or multi-byte character codes to allow the utilization of device fonts is described in detail in co-pending application Ser. No. 09/157,917, filed on even date herewith, for a PRINTER DRIVER AND METHOD FOR SUPPORTING WORLD-WIDE SINGLE BINARY FONT FORMAT WITH BUILT IN SUPPORT FOR DOUBLE BYTE CHARACTERS, assigned to the assignee of the instant application, the disclosure and teachings of which are hereby incorporated by reference.

Once sent 128, the driver then stores the text object location information 130 in an memory storage element 132 (see FIG. 3B) before terminating its process 134 to wait for the receipt of another print call from the GDI 104. If, however, at decision block 124, it is determined that the text object is not supported by a printer resident or downloadable device font, the text object is drawn as a bitmap 136 on the bitmap buffer 138, as is common with the generation of True Type fonts. Once drawn 136, the text object bitmap location information is stored 140 in the memory element 118 before terminating the process 134 and waiting for a further print call from the GDI 104.

During this process, if it is determined that there is an overlap between the commanded location of the text element to be printed and an existing bitmap image as determined at block 122, the text object is drawn 142 as part of the bitmap graphic on the bitmap buffer 138. As will be described more fully hereinbelow, the region which is drawn as part of the bitmap graphic includes the union of the bounding rectangle of the bitmap graphic and that of the text element. Once this has been drawn 142 on the bitmap buffer 138, the union bitmap location information is stored 144 in memory element 118 prior to terminating the process 134 until the receipt of a further print call from the GDI 104.

If the analysis initially performed on the print object 116 determines that the print object is a graphical bitmap, the driver first compares 146 the location of the bitmap object to the location information of text objects sent to the output buffer 126 as stored in memory element 132. If this analysis yields that there is no overlap 148 of the location of the bitmap bounding rectangle and any printed text elements, the graphic object is drawn 150 on the bitmap buffer 138. Once drawn 150, the drawing object bitmap location information is stored 152 in memory element 118, i.e., the bitmap buffer is now "marked" since it has just been drawn into. If, however, an overlap 148 is determined to exist between the drawing object bitmap location and a text object which has been sent to the output buffer, the driver then sends a white rectangle to the output buffer to erase the text object in the printer at that location 154. (for SRCCOPY and PATCOPY Rops). The driver then draws the graphic object to the output buffer. The graphic object drawn into the buffer marks the bitmap location information and is stored 144 in the memory element 118 before terminating the process 134 and awaiting an additional print call from the GDI 104.

As will be recognized by one skilled in the art, the printing of a document requires many print calls to be processed by the printer driver, and hence the functional flow described in FIGS. 3A and 3B will be processed multiple times in the printing of a single document. As described above, in each single pass the driver determines for each object whether there is any previously drawn graphics in the bitmap where the text is to be drawn or printed. If there is, the text is drawn in the bitmap so that it can properly interact with this graphic, thus overcoming the Z-order problem described above. If there is no overlap, the text is downloaded or sent as a device font directly to the printer (via the output buffer) for enhanced printing performance. Furthermore, a preferred embodiment of the driver of the instant invention logs the location of the text that has been downloaded directly to the printer (via the output buffer). This enables the driver to determine if any graphic bitmap is to be drawn over already downloaded text. If the driver determines from this information that a bitmap is to be drawn in the same or overlapping regions with the already downloaded text, the driver can send a white rectangle directly to the printer to erase the appropriate region in the printer to ensure correct output when the text and bitmap are redrawn as a single union bitmap graphic, and transparently combined during the print process.

Figure 4:
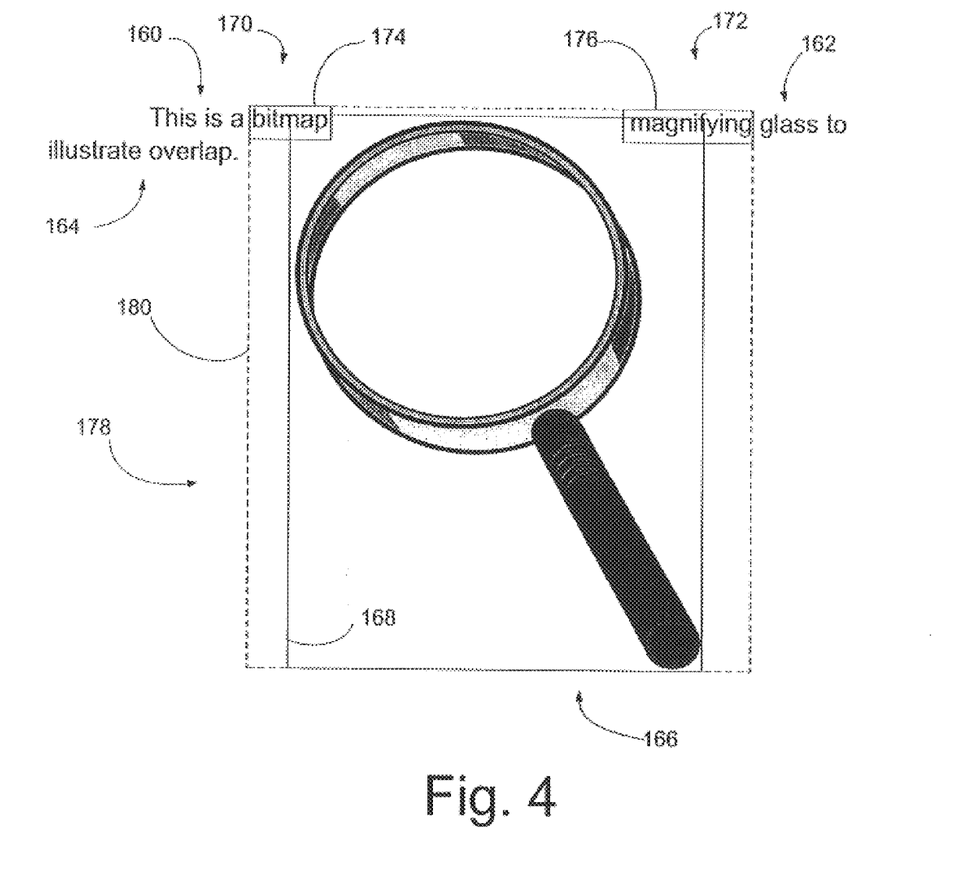
FIG. 4 illustrates an exemplary document merging text and graphics as processed by an embodiment of the instant invention.

To illustrate the analysis and drawing of text objects as part of the bitmap graphic, reference is now made to FIG. 4. As may be seen from this figure, both text and graphics have been merged in this document, and the text has been wrapped around the graphics. The wrapping of text around graphics has become common in many applications, such as newsletters, reports, etc. As may be seen, the words "This is a" 160, "glass to" 162, and "illustrate overlap." 164 have no overlap with the bitmap graphic 166. However, due to the bounding rectangle 168 of the bitmap graphic 166, text elements 170 and 172 do have an overlap with the bitmap graphic 166. Specifically, the text region of the text element 170 is bounded by rectangle 174, and text element 172 is bounded by rectangle 176. As these bounding rectangles 174, 176 have an overlap with the bitmap bounding rectangle 168, the potential for merging problems (Z-order problem) described above exists. Therefore, text elements 170 and 172 are drawn as part of the bitmap graphic 166, and not printed as separate text elements. The new bitmap graphic 178 has a bounding rectangle 180 which corresponds to the union of the regions bounded by bounding rectangles 168, 174, and 176. The location of this larger bounding rectangle 180 is stored in the bitmap location memory element 118 illustrated in FIG. 3A. This information will be used for future comparisons with other print calls to determine if any further overlap between new text elements and this larger bitmap image 178 will exist. Any further overlaps will result in additional unions being taken (and further text elements redrawn as part of the bitmap image). In this way, the document is essentially divided into separate regions which are characterized as either text or graphics. Advantageously, this regionalizing and characterization is accomplished in a single pass per drawing call as illustrated in FIGS. 3A and 3B. Numerous modifications and alternative embodiments of the instant invention will be apparent to those skilled in the art in view of the foregoing description. Accordingly, this description is to be construed as illustrative only and is for the purpose of teaching those skilled in the art the best mode for carrying out the invention. Details of the structure and implementation of the various components described above can be varied substantially without departing from the spirit of the invention, and exclusive use of all modifications that come within the scope of the appended claims is reserved.

What is claimed is:

1. A computer readable medium having computer-executable instructions for performing steps, comprising:

receiving a print call from a graphics device interface, the print call including a text element to be printed by a raster printer on a document at a first predetermined location;

analyzing bitmap location information in a bitmap location storage buffer to determine if the first predetermined location overlaps with the bitmap location information stored therein;

redrawing an existing bitmap on a bitmap buffer to include the text element when the step of analyzing bitmap location information reveals overlap with the existing bitmap; and storing the redrawn bitmap location information in the bitmap location storage buffer when the step of analyzing bitmap location information reveals overlap.

2. The computer readable medium having stored thereon computer-executable instructions for performing the steps recited in claim 1, further comprising:

sending the text element to an output buffer when the step of analyzing bitmap location information reveals no overlap; and storing the first predetermined location information for the text element in a text element location storage buffer when the step of analyzing bitmap location information reveals no overlap.

3. The computer readable medium having stored thereon computer-executable instructions for performing the steps recited in claim 2, wherein the text element sent by the graphics device interface includes a character code, and wherein the step of sending the text element to an output buffer comprises:
- determining if the text element is supportable by a raster printer downloadable device font;
- downloading a device font to the raster printer for storage therein, the device font utilizing device font character codes to select individual glyphs for printing;
- translating the text element character code into a device font character code; and
- sending the device font character code to the output buffer.

4. The computer readable medium having stored thereon computer-executable instructions for performing the steps recited in claim 2, wherein the text element sent by the graphics device interface includes a character code, and wherein the step of sending the text element to an output buffer comprises:
- determining if the character code is supported by a device resident font;
- translating the character code received from the graphics device interface to a device font character code when the character code is supported by a device resident font; and
- sending the device font character code to the output buffer.

5. The computer readable medium having stored thereon computer-executable instructions for performing the steps recited in claim 4, further comprising:
- drawing the text element as a bitmap text image on the bitmap buffer when the character code is not supported by a device resident font; and
- storing location information of the bitmap text image on the bitmap location storage buffer.

6. The computer readable medium having stored thereon computer-executable instructions for performing the steps recited in claim 1, wherein the step of redrawing an existing bitmap on a bitmap buffer to include the text element comprises:
- identifying a first bounding region for the text element;
- identifying a second bounding region for the existing bitmap;
- identifying a third bounding region comprising the union of the first and the second bounding regions; and
- redrawing the existing bitmap to include all of the third bounding region.

7. The computer readable medium having stored thereon computer-executable instructions for performing the steps recited in claim 1, further comprising:
- receiving a print call from the graphics device interface, the print call including a bitmap image to be printed by the raster printer on a document at a second predetermined location;
- analyzing text element location information in a text element location storage buffer to determine if the second predetermined location overlaps with the text element location information stored therein;
- redrawing the bitmap image on the bitmap buffer to include an existing text element when the step of analyzing text element location information reveals overlap with the existing text element;
- sending a white rectangle having identical coordinates as the existing text element to the output buffer; and
- storing the redrawn bitmap location information in the bitmap location storage buffer when the step of analyzing bitmap location information reveals overlap.

8. The computer readable medium having stored thereon computer-executable instructions for performing the steps recited in claim 7, further comprising:
- drawing the bitmap image to the bitmap buffer when the step of analyzing text element location information reveals no overlap; and
- storing the second predetermined location information for the bitmap image in the bitmap location storage buffer when the step of analyzing text element location information reveals no overlap.

9. The computer readable medium having stored thereon computer-executable instructions for performing the steps recited in claim 7, wherein the step of redrawing the bitmap image on the bitmap buffer to include an existing text element further comprises:
- identifying a fourth bounding region for the text element;
- identifying a fifth bounding region for the bitmap image;
- identifying a sixth bounding region comprising the union of the fourth and the fifth bounding regions; and
- redrawing the bitmap image to include all of the third bounding region.

* * * * *

UNITED STATES PATENT AND TRADEMARK OFFICE
CERTIFICATE OF CORRECTION

PATENT NO.    : 6,377,354 B1                                          Page 1 of 1
DATED         : April 23, 2002
INVENTOR(S)   : Nguyen et al.

It is certified that error appears in the above-identified patent and that said Letters Patent is hereby corrected as shown below:

<u>Column 2,</u>
Line 44, "modem" should read -- modern --.
Line 51, "windows" should read -- Windows --.

Signed and Sealed this

First Day of July, 2003

JAMES E. ROGAN
*Director of the United States Patent and Trademark Office*